United States Patent [19]

Sasaki

[11] Patent Number: 5,432,470

[45] Date of Patent: Jul. 11, 1995

[54] OPTOELECTRONIC INTEGRATED CIRCUIT DEVICE

[75] Inventor: Goro Sasaki, Yokohama, Japan

[73] Assignee: Sumitomo Electric Industries, Ltd., Japan

[21] Appl. No.: 921,027

[22] Filed: Jul. 29, 1992

[30] Foreign Application Priority Data

Aug. 2, 1991 [JP] Japan .................................. 3-194525
Aug. 2, 1991 [JP] Japan .................................. 3-194526
Aug. 2, 1991 [JP] Japan .................................. 3-194527
Sep. 6, 1991 [JP] Japan .................................. 3-227267

[51] Int. Cl.$^6$ ................. H01L 31/00; G05F 1/10; G06G 7/12; H01J 40/14
[52] U.S. Cl. .................................. 327/514; 327/515; 327/560; 327/561; 327/562; 327/530; 327/535; 327/537; 250/214 R; 250/214 LA; 250/553
[58] Field of Search ............... 307/311, 490, 491, 520, 307/542, 542.1, 543; 328/2; 250/214 A, 214 LA, 214 R, 551, 553; 327/514, 515, 560, 561, 562, 530, 535, 537

[56] References Cited

U.S. PATENT DOCUMENTS 4,752,693 6/1988 Nagano .............................. 307/311
5,281,805 1/1994 Sauer ................................ 250/214 R

FOREIGN PATENT DOCUMENTS 2164515 3/1986 United Kingdom .

OTHER PUBLICATIONS

Keigo AGA et al, "High-Speed Eight-Channel Optoelectronic Integrated Receiver Arrays Comprising Gainas Pin PDS and Alinas/Gainas Hemts", *Optical Fiber Communication Conference*, p. 3, (9 Feb. 1991).

W. S. Lee et al, "Monolithic Integration of an INP/IN-GAAS Four-Channel Transimpedance Optical Receiver Array", *Electronic Letters*, vol. 26, No. 22, Stevenage, GB, pp. 1833-1834 (25 Oct. 1990).

Primary Examiner—Timothy P. Callahan
Assistant Examiner—Trong Phan
Attorney, Agent, or Firm—Beveridge, DeGrandi, Weilacher & Young

[57] ABSTRACT

There is disclosed on optoelectronic integrated circuit comprising, a plurality of channels each including an optical receiving device for converting a received optical signal to an electric signal, and an amplifier for amplifying an output signal of the optical receiving device, the channels being integrated on the same semiconductor substrate, electric power source nodes of at least two of the amplifiers of the respective channels being connected to a common electric power source node, and the common electric power source node being connected through a resistor element to an electric source power supply terminal for supplying an electric source power to the channels.

19 Claims, 12 Drawing Sheets

OPTOELECTRONIC INTEGRATED CIRCUIT DEVICE

BACKGROUND OF THE INVENTION

This invention relates to an optoelectronic integrated circuit device for use in optical receiving units or others of receivers for the optical fiber communication.

Figure 1:
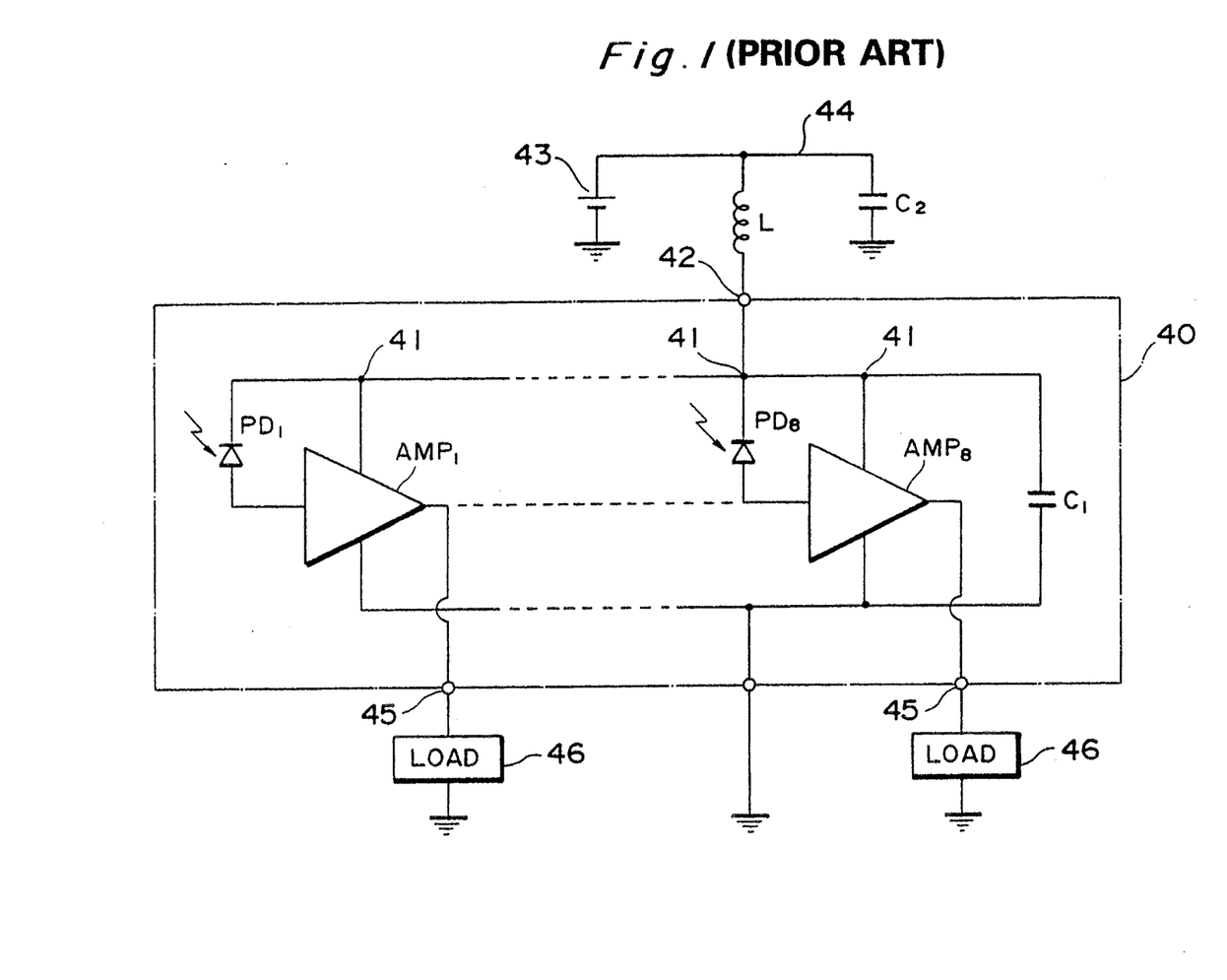
FIG. 1 is a general circuit diagram of the conventional optoelectronic integrated circuit array.

A conventional optoelectronic integrated circuit device (hereinafter called OEIC array) for use in optical receiving units or others for optical fiber communication is disclosed in "High-speed eight-channel optoelectronic integrated receiver arrays comprising GaInAs PIN PDs and AlInAs/GaInAs HEMTs", Optical Fiber Communication Conference, Tuesday, Feb. 19, 1991, Lecture No. Tub2. Its schematic circuit diagram is shown in FIG. 1.

This OEIC array 40 is provided by monolithically integrated eight channel units of an optical receiving circuit. Each channel unit includes a photodiode PD ($PD_1 \sim PD_8$) for converting a received optical signal to an electric signal, and an amplifier $AMP_1$-$AMP_8$) having resistors, high electron mobility transistors or others for amplifying the electric signal.

In such conventional OEIC array 40, the electric power source nodes (contacts) 41 of the respective preamplifiers AMP are connected to one another and have the same potential. Because of such circuitry, it is a problem that crosstalk, i.e., leakage of a signal input to one channel to other channels, has a level as high as −30 dB.

A source for crosstalk may be as follows: condensers $C_1$ and $C_2$ are inserted in circuits inside and outside the OEIC array 40 for the reduction of an impedance of the AC current component, and all the electric power source circuits are grounded through the condensers $C_1$, $C_2$. On the other hand, an electric source power supply terminal 42 is usually supplied with a current from an electric power source 43 through a limited length of an electric power source wiring 44. This electric power source wiring 44 has an inductance L as a distributed constant. This inductance L and the condenser $C_2$ resonate at a specific frequency, and at this frequency an impedance between the electric source power supply terminal 42 and the ground becomes infinite. When a signal is input to one channel, an output voltage corresponding to the signal is generated at the output terminal 45, and a signal current is supplied to a load 46. This signal current is supplied by the electric power source 43. At the time of the supply of the signal current from the electric power source 43, a voltage equal to a product of the impedance between the electric source power supply terminal 42 and the ground, and a value of a current flowing there is generated in the electric source power supply terminal 42.

Accordingly, at the above-described resonance frequency the impedance between the electric power source supply terminal 42 and the ground is infinite, and a very large voltage change or deflection corresponding to the input signal current occurs. Generally, the preamplifier AMP has a deflected output voltage corresponding to a deflection of an electric power source voltage. Consequently, at this resonance frequency, an electric signal input to one channel causes a large source voltage deflection which causes deflections of output voltages of the all the other channels through the common electric power source wiring. This is a cause for the occurrence of crosstalk.

Figure 2:
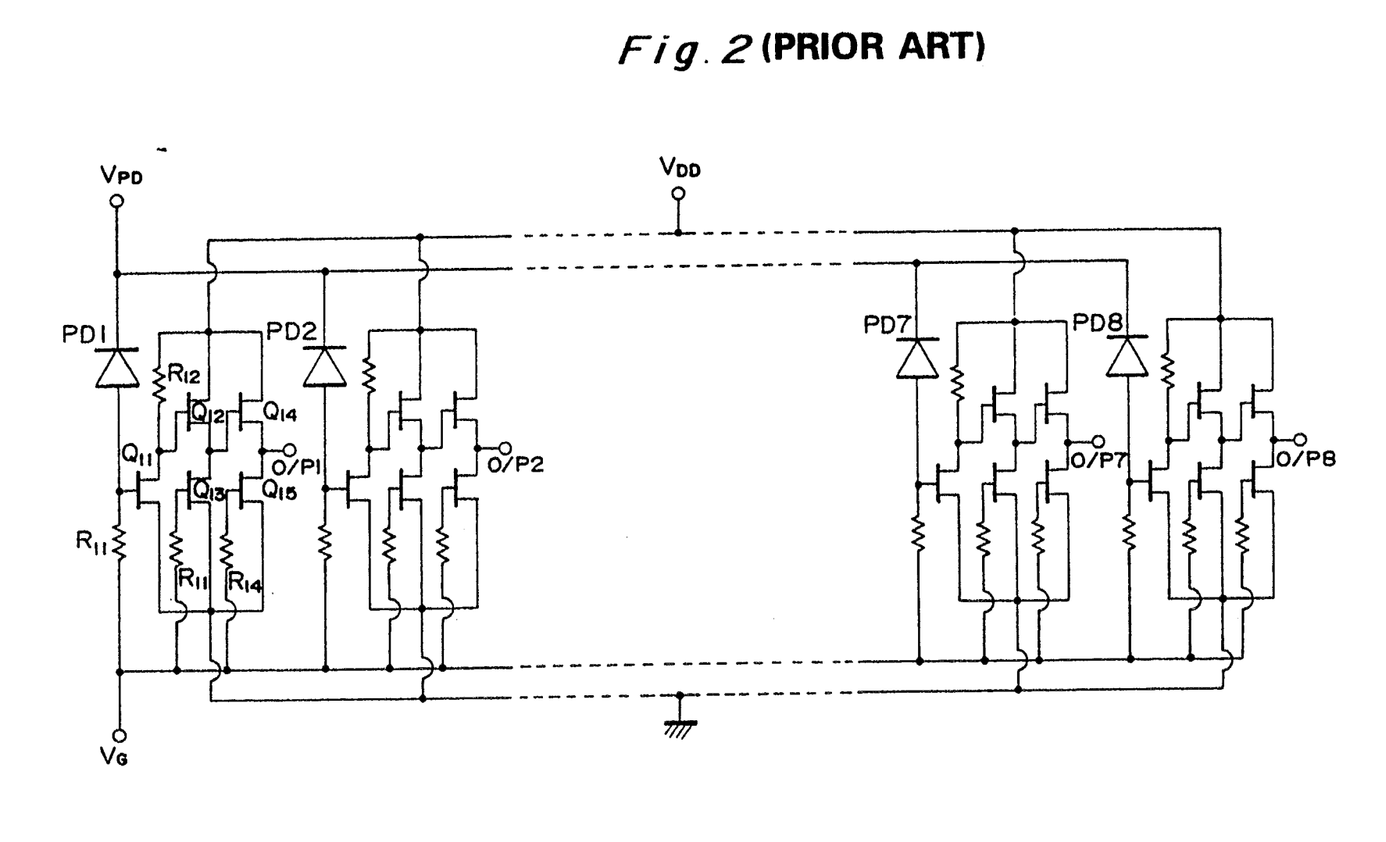
FIG. 2 is a schematic circuit diagram of a first conventional OEIC array.

FIG. 2 shows a detailed structure of an equivalent circuit of the OEIC array 40 in FIG. 1. In this OEIC array, the first channel unit of the eight channel units includes a PIN photodiode $PD_1$, and an amplifier AMP, whose components include resistors $R_{11} \sim R_{14}$, and high electron mobility transistors (HEMTs) $Q_{11} \sim Q_{15}$. The transistor $Q_{11}$ and the resistor $R_{12}$ constitute an amplification stage. The transistors $Q_{12} \sim Q_{15}$, and the resistors $R_{13}$, $R_{14}$ constitute a two-stage source follower. The remaining channel units have the same structure as the first channel.

Figure 3:
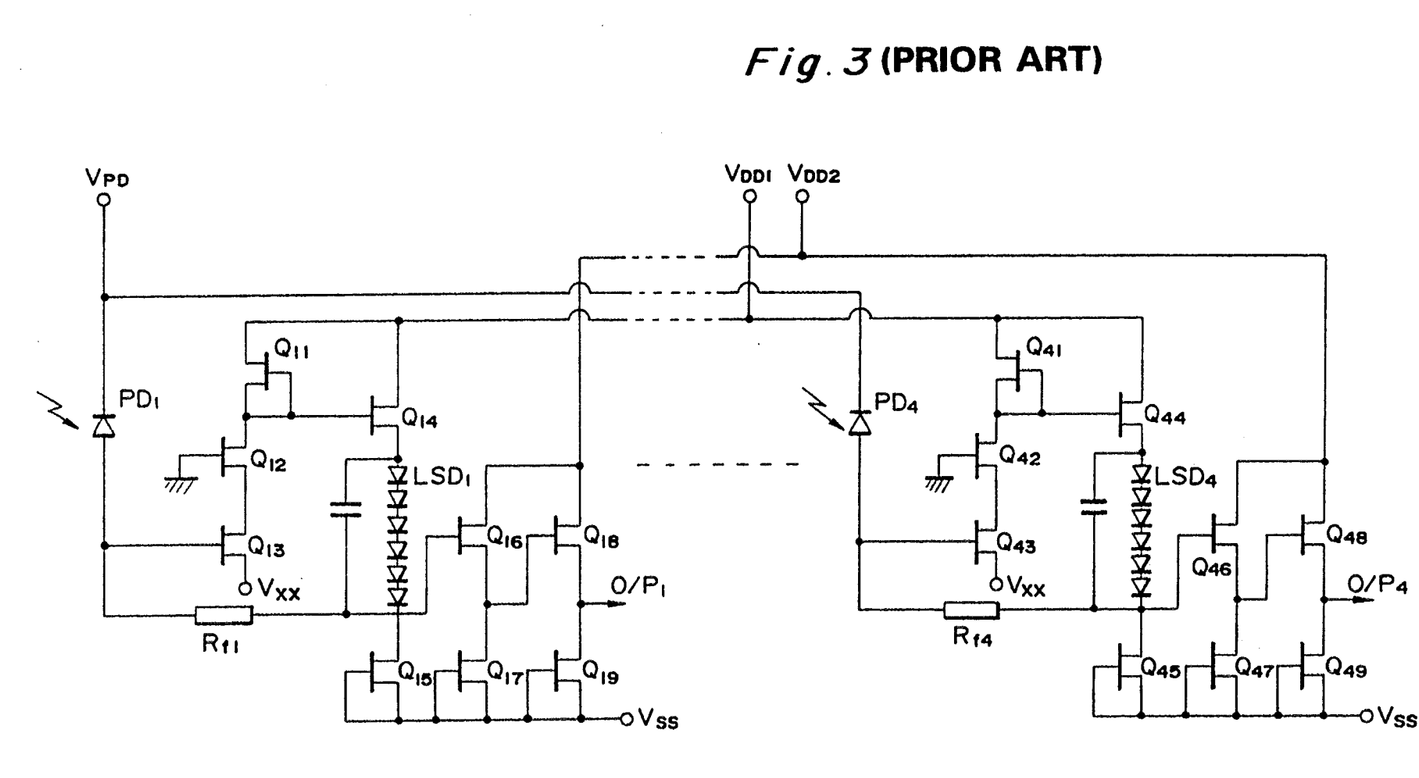
FIG. 3 is a schematic circuit diagram of a second conventional OEIC array.

Another example of the conventional OEIC arrays of this kind is disclosed in "Monolithic Integration of an InP/InGaAs Four-Channel Transimpedance Optical Receiver Array", Electronics Letters, vol. 26, pp. 1833~1834, October 1990. FIG. 3 schematically shows its circuit diagram.

In this OEIC array, four channel unit constituting the optical receiver are monolithically integrated. A first one of the four channels comprises a PIN photodiode $PD_1$, an input resistor device $R_{f1}$, junction transistors $Q_{11} \sim Q_{19}$, and level shift diodes $LSD_1$. The transistors $Q_{11} \sim Q_{13}$ constitute an amplification stage for amplifying an electric signal photo-electrically converted by the photodiode $PD_1$. The transistors $Q_{14}$, $Q_{15}$, and the diodes $LSD_1$ constitute a level shifting stage for shifting a d.c. voltage of an amplified signal outputted by the amplifying stage. The transistors $Q_{16} \sim Q_{19}$ constitute a source follower stage for securing a fan out of an optical receiver output $O/P_1$. The remaining channel units have the same circuitry as the first channel unit.

In a conventional OEIC array of FIG. 3, the amplification stages and the level shift stages of the respective preamplifiers are supplied with an electric source power $V_{DD1}$ through an electric power source wiring which is common to the respective channels. The source follower stages are supplied, with an electric power source $V_{DD2}$ through a different electric power source wiring which is common to the respective channels. In a conventional OEIC array of FIG. 2, all the stages of the respective preamplifiers are supplied with an electric source power $V_{DD}$ through an electric power source wiring which is common to the respective channels. In the conventional OEIC arrays of these structures, large modulated currents are caused by input signals in the level shift stages and the source follower stages as will be described below. Consequently in the electric power supply sources for these stages, large source voltage deflections are caused by the modulated currents. Such source voltage deflections affect the common electric power sources of the respective channels connected to these stages. That is, a source voltage deflection caused by an input signal in one channel affects the power sources of the other channels, and causes voltage deflections in the output terminals of the other channels. Consequently crosstalk takes place among the channels. As a result, problem crosstalk deteriorates minimum sensitivities of the optical receiving circuits of the respective channels.

Figure 4:
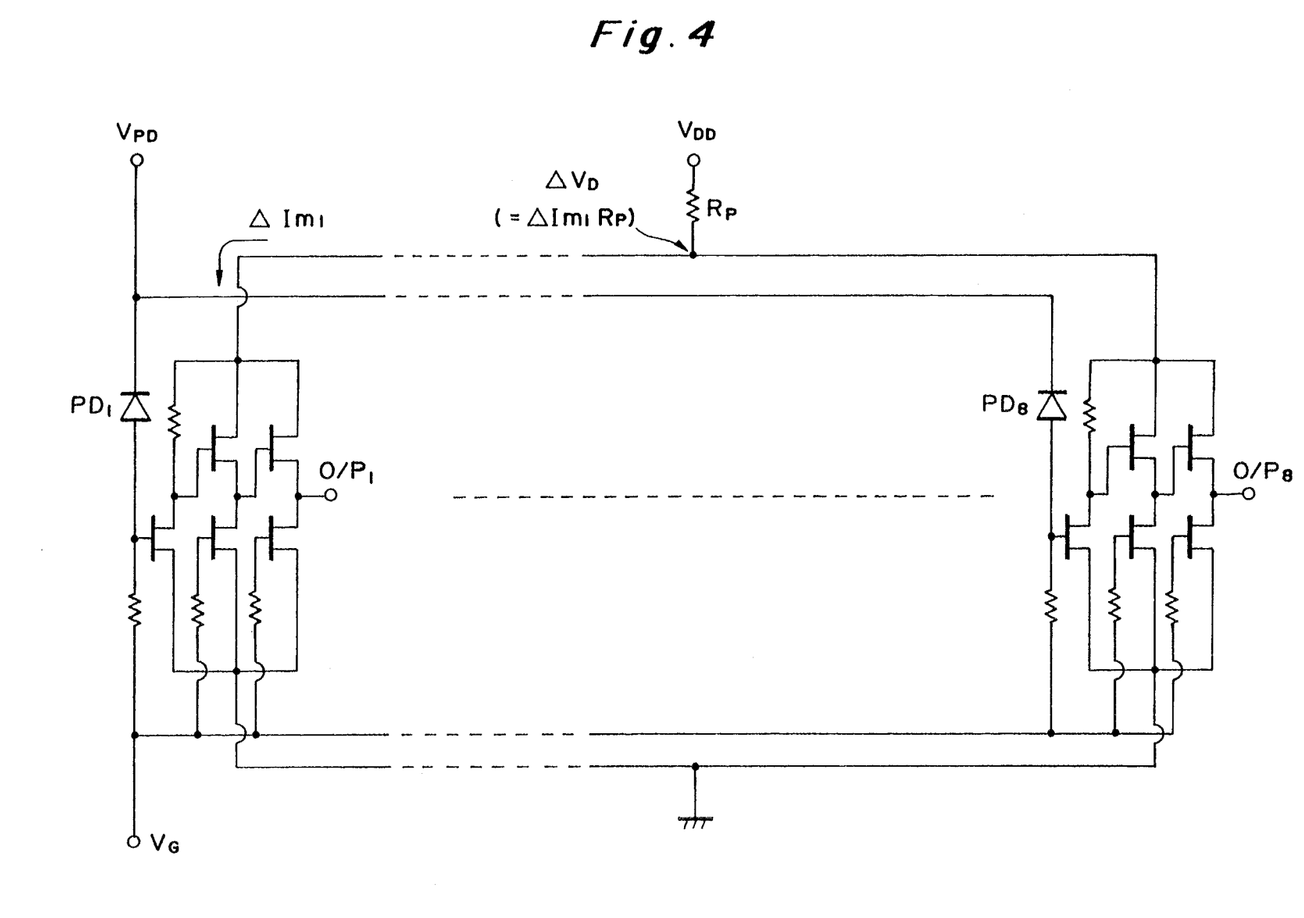
FIG. 4 is a circuit diagram explaining a principle of the occurrence of crosstalks in the second conventional OEIC array.

With respect to the OEIC array of FIG. 2 using HEMTs, explanation will be made as follows with reference to FIG. 4. Here it is assumed, for example, that an optical signal input to the first channel is converted to an electrical signal by a photodiode $P_{D1}$, and a modulated current $\Delta I_{ml}$ is caused by an input signal when the electric signal is amplified by the preamplifier consisting of an amplification stage and a follower stage. 90% of a modulated current $\Delta I_{ml}$ is generated in the source follower state. This modulated current $\Delta I_{ml}$ flows through the wiring having a resistance $R_p$ to thereby generate a voltage deflection $\Delta V_D$. This wiring resistance $R_p$ is equivalently shown at the electric power source terminal $V_{DD}$ for supplying an electric source power commonly to the respective preamplifiers. The above-described modulated current $\Delta I_{ml}$ flows through this wiring resistor and generates a voltage deflection $\Delta V_D$ ($=\Delta I_{ml} \times R_p$). This voltage deflection $\Delta V_D$ is source voltage deflections of the preamplifiers of the other channels as it is. Generally when a source voltage is deflected, an output voltage of the preamplifier is deflected. Accordingly, when an optical signal is input to one channel, source voltages of the preamplifiers of the other channels are deflected, and the deflected source voltages deflect output voltage of the other channels with a resulting in crosstalk.

In the OEIC array of FIG. 3 using junction transistors, modulated currents are generated due to input signals. 90% of a modulated current is generated in the level shift stage or the source follower stage. The amplification stage and the level shift stage of each preamplifier are supplied with a source voltage $V_{DD1}$ through the common electric power source wiring. Consequently, when a modulated current occurs in the level shift stage of one preamplifier, a voltage deflection $\Delta V_D$ is generated in the common electric power source wiring as described above. This voltage deflection $\Delta V_D$ deflects source voltages of the preamplifiers of the other channels through the common power source wiring, and deflects output voltages. That is, an optical signal input to one channel deflects output voltages of the other channels, and crosstalk takes place.

The reason for output voltages being deflected when source voltages of the preamplifiers are deflected is as follows. That is, as shown in FIG. 4, each preamplifier includes an amplification stage, a level shift stage, a source follower stage. Output voltages of the level shift stage and of the source follower stage are not substantially deflected. But an output voltage of the amplification stage is deflected in a range from 50% to 100% and is sensitive to the voltage deflections. Accordingly, when a voltage deflection due to a source voltage deflection takes place in an output of the amplifier of one channel, this voltage deflection directly affects the source follower stages and the level shift stages. That is, when a source voltage of a preamplifier is deflected, output voltages are adversely deflected.

Because of crosstalk due to this cause, as described above, the minimum receiver sensitivity of the optical receiving circuit of each channel deteriorates.

The above-described modulated current $\Delta I_{ml}$ is bypassed to the ground by a condenser monolithically integrated on the same semiconductor chip. But the bypass condenser integrated on the semiconductor chip can only have a limited capacity, and it is impossible to give the condenser a sufficiently large capacity. Accordingly all of a generated modulated current cannot be bypassed, and only a part of the current can be bypassed. Consequently a residual modulated current which has not been able to be removed is a cause for the occurrence of the above-described crosstalk. On the other hand, it makes the size of a semiconductor chip impractically large to increase a capacity of the condenser so as to remove all of a modulated current.

SUMMARY OF THE INVENTION

An object of this invention is to provide an optoelectronic integrated circuit device which includes a plurality of monolithically integrated channels which can decrease crosstalk among channels, crosstalk being the phenomenon wherein operation of an optical receiver in one channel unit is affected by operation of optical receiver circuits in the other channel units.

A first type of optoelectronic integrated device according to the present invention is a circuit comprising a plurality of channel units each including an optical receiving device for converting a received optical signal to an electric signal, and an amplifier for amplifying an output signal of the optical receiving device, wherein the channel units are formed on a same semiconductor substrate, and an internal power supply bus for transmitting operating power and a power supply terminal of the optoelectronic integrated circuit connected to an external power supply for supplying operating power are connected to each other through a resistor device.

Generally, a resonance phenomenon occurs in a circuit which includes an inductor and a condenser (capacitor) and an external power supply circuit. The impedance of a LC combination at resonant frequency is infinite, theoretically. According to this invention, a resistor device R is connected with the LC combination. In the presence of a resistance component, the impedance at the resonant frequency is lowered. In view of this, the OEIC array according to this invention has a resistor device inserted between the power supply terminal and the power supply to thereby lower an impedance at the resonance.

The invention according to a second embodiment is an optoelectronic integrated circuit comprising a plurality of channel units each including an optical receiving device for converting a received optical signal to an electric signal, and an amplifier having an amplification stage circuit for amplifying an output signal of the optical receiving device, an emitter follower stage for lowering an output impedance of the channels, wherein the plurality of channel units are formed on a same semiconductor substrate.

According to this invention, the power supply to the amplification stages of the respective preamplifiers, which are sensitive to voltage changes is made independently from the electric source power supply to stages of the respective preamplifiers other than the amplification stages, such as the emitter followers stages and others. Consequently, if a modulated current is generated, due to optical signal input to one channel, in the emitter follower stage or others thereof, and a voltage change takes place in the power supply for the emitter follower stages and so on, supply voltages of the amplification stages of the other channel units, which are sensitive to the voltage changes, are not deflected. Consequently output voltages of the other channel units are not changed even if an optical signal is input to another channel, and thus no crosstalk occurs.

The invention according to a third embodiment is an optoelectronic integrated circuit comprising a plurality of channel units each including an optical receiving device for converting a received optical signal to an electric signal, and an amplifier having an amplification storage circuit for amplifying an output signal of the optical receiving device, and source follower stage circuit for lowering an output impedance, wherein the plurality of channel units are formed on a same semiconductor substrate. An internal power supply bus for transmitting operating power to the amplification stage circuits of the respective channel units is electrically separated from an internal power supply bus for transmitting operating power to the other circuits.

According to this embodiment, the power supply to the amplification stages of the respective amplifiers, which are sensitive to voltage changes are made independently from the power supply to stages of the respective amplifiers other than the amplification stages, such as the source follower stages and other. Consequently, if a modulated current is generated due to an optical signal inputted to one channel unit in any source follower stage, and a voltage change takes place in the power supply for a source follower stage, supply voltages of the amplification stages of the other channel units, which are sensitive to the voltage change, are not affected. Consequently, output voltages of the other channel units do not change even if optical signal is input to a channel, thus no crosstalk occurs.

The invention according to a fourth embodiment is an optoelectronic integrated circuit comprising a plurality of channel unit each including an optical receiving device for converting a received optical signal to an electric signal, and an amplifier for amplifying an output signal of the optical receiving device, the channel units being formed on the same semiconductor substrate. Internal power supply buses for transmitting operating power to the respective channel units are electrically separated from each other, and power supply terminals for connecting an external power supply for supplying operating power are provided for the respective channel units.

According to this embodiment, the respective channel units have their own power supply terminals separated from each other for operating the amplifiers. Each amplifier is supplied with an independent power supply. Consequently, when the channel operate, it does not result in power supply deflections in the other channels, thus preverting crosstalk.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENTS

Embodiments of this invention will be explained with reference to the drawings attached hereto.

Figure 5:
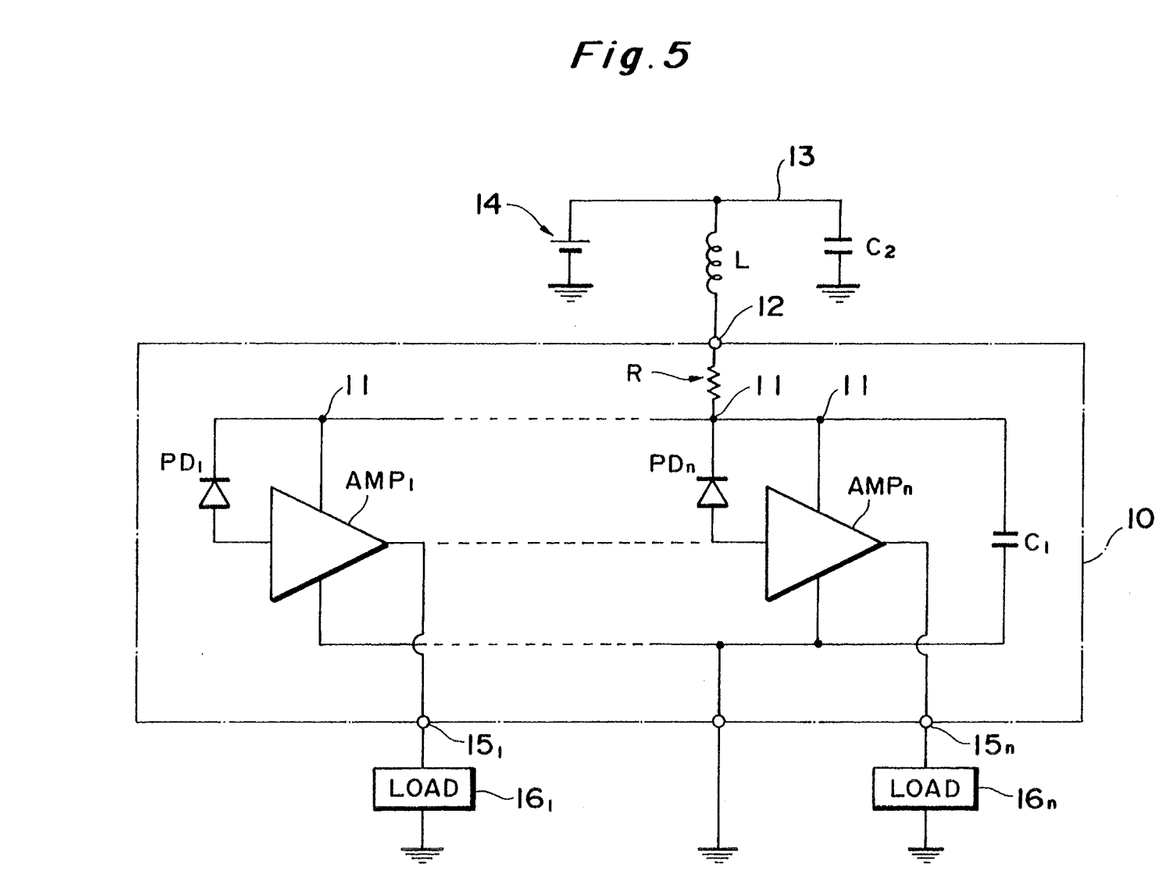
FIG. 5 is a schematic circuit diagram of the OEIC array according to a first embodiment of this invention.

FIG. 5 shows a schematic circuit diagram of the OEIC array according to a first embodiment of this invention.

This OEIC array is not limited specifically in a number of channels but generally has 4~12 channels depending on applications. FIG. 5 shows the first channel and the final n (4~12)th channel and does not show the second to the (n−1)th channel. These channels are monolithically integrated on the same semiconductor substrate. Each channel includes photodiodes PD ($PD_1 \sim PD_n$) for converting a received optical signal to an electric signal, and amplifiers AMP ($AMP_1 \sim AMP_n$) including a resistor, high electron mobility transistors, and so on for amplifying the electric signal.

The amplifiers $AMP_1 \sim AMP_n$ and the photodiodes $PD_1 \sim PD_n$ of the respective channels are connected to one another by common electric source power supply contacts where they have the same potential. The common electric power source contacts 11 and an electric source power supply terminal 12 are connected to each other through a resistor device R. The resistor device R is formed by depositing a metal thin film on the semiconductor substrate, but may be a resistor attached to the semiconductor substrate. This electric source power terminal 12 is a metal electrode pad provided on the semiconductor substrate and is connected to an external electric power source circuit by a conductive wire such as gold. The terminal 12 is an input terminal for supplying an electric source power to the OEIC array 10. Condensers $C_1$, $C_2$ are provided in an internal electric power source circuit and an external electric power source circuit for decreasing impedance. The electric power source circuits are grounded through the condensers $C_1$, $C_2$. In each channel, an output signal of the photodiode PD is amplified by the amplifier AMP, and the amplified output is supplied to the output terminal $15_1 \sim 15_n$.

The electric source power supply terminal 12 is supplied with a current from an electric power source 14 through a limited length of an electric source power supply wiring 12, e.g., Au wire. This electric power source wiring 13 has an inductance L as a distributed constant. When an optical signal is input to at least one of the photodiodes PD, an electric source power is supplied to the channel which has received the input signal, at the electric power source supply terminal 12 connected to the electric power source 14. At this time, as described above, the inductance L of the electric power source wiring 13, and the condenser C2 resonate at a specific frequency. But in this embodiment, a resistor device R is inserted between the electric source power supply terminal 12 and the common electric power source contact 11. It is generally known that when an inductance and a condenser resonate, an impedance at the resonance is lowered in the presence of a resistor component. A voltage deflection at the common electric power source contact 11 is proportional to the impedance between the respective electric power source contacts and the ground. Accordingly, an impedance at the resonance can be suppressed by inserting the resistor device R between the electric source power supply terminal 12 and the common electric power source contact 11. Consequently, a voltage deflection of the common electric power source contact 11, i.e., a source voltage deflection at the amplifier AMP, is decreased, and the other channels are minimally affected by the voltage deflection. Consequently crosstalk is decreased. A capacity of the condenser $C_1$ is generally 100 pF and the device can be monolithically formed on the semiconductor substrate, but may be provided by a condenser chip externally provided on the semiconductor substrate. Because of condenser $C_1$, the common electric power source contact 31 has an a.c. earth potential. In many cases the capacity of the condenser $C_2$ will be more than 10 times that of the condenser $C_1$. Generally, the condenser $C_2$ is externally provided on a semiconductor chip.

Resistance values of the resistor device R will be discussed below. The insertion of the resistor device R between the electric source power supply terminal 12 and the common electric power source contact 11 lowers impedance at resonance. But an impedance between the common power source contact 11 and the ground is increased when the value of the resistor device R is increased above a set value, resulting in increased crosstalk. Accordingly there is an optimum range of the resistance value of the resistor device R.

Figure 6:
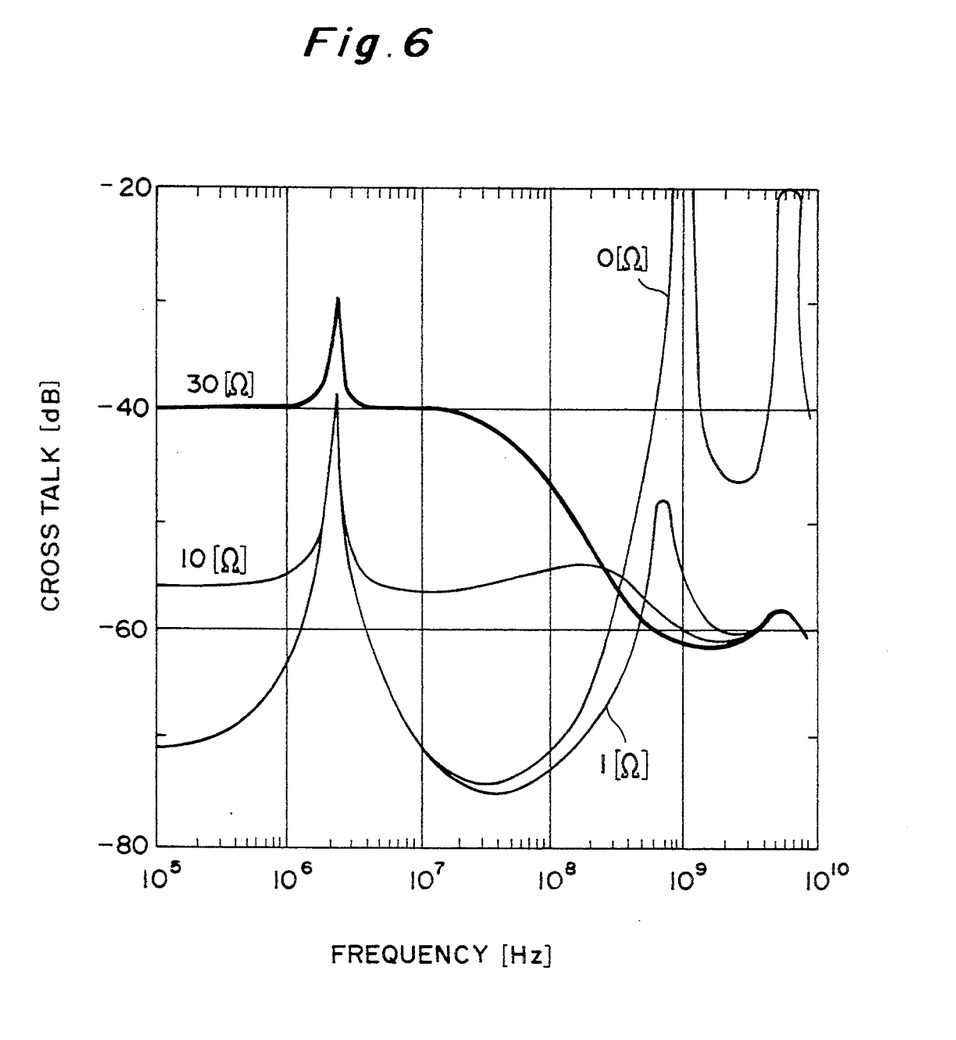
FIG. 6 is a graph of frequency characteristics of crosstalks with a resistance value of the connected resistor device as a parameter.

FIG. 6 shows frequency characteristics of crosstalks with resistance values of the resistor device R as a parameter. It is seen from FIG. 6 that when values of the resistor device R are $1\Omega \sim 10\Omega$, crosstalk is decreased at a frequency below 100 MHz, and when a resistance value is above $30\Omega$, crosstalks reach $-30$ dB at about 2 MHz. It is seen from these results that a resistance value of the resistor device R is optimumly $1\Omega \sim 10\Omega$.

Figure 7:
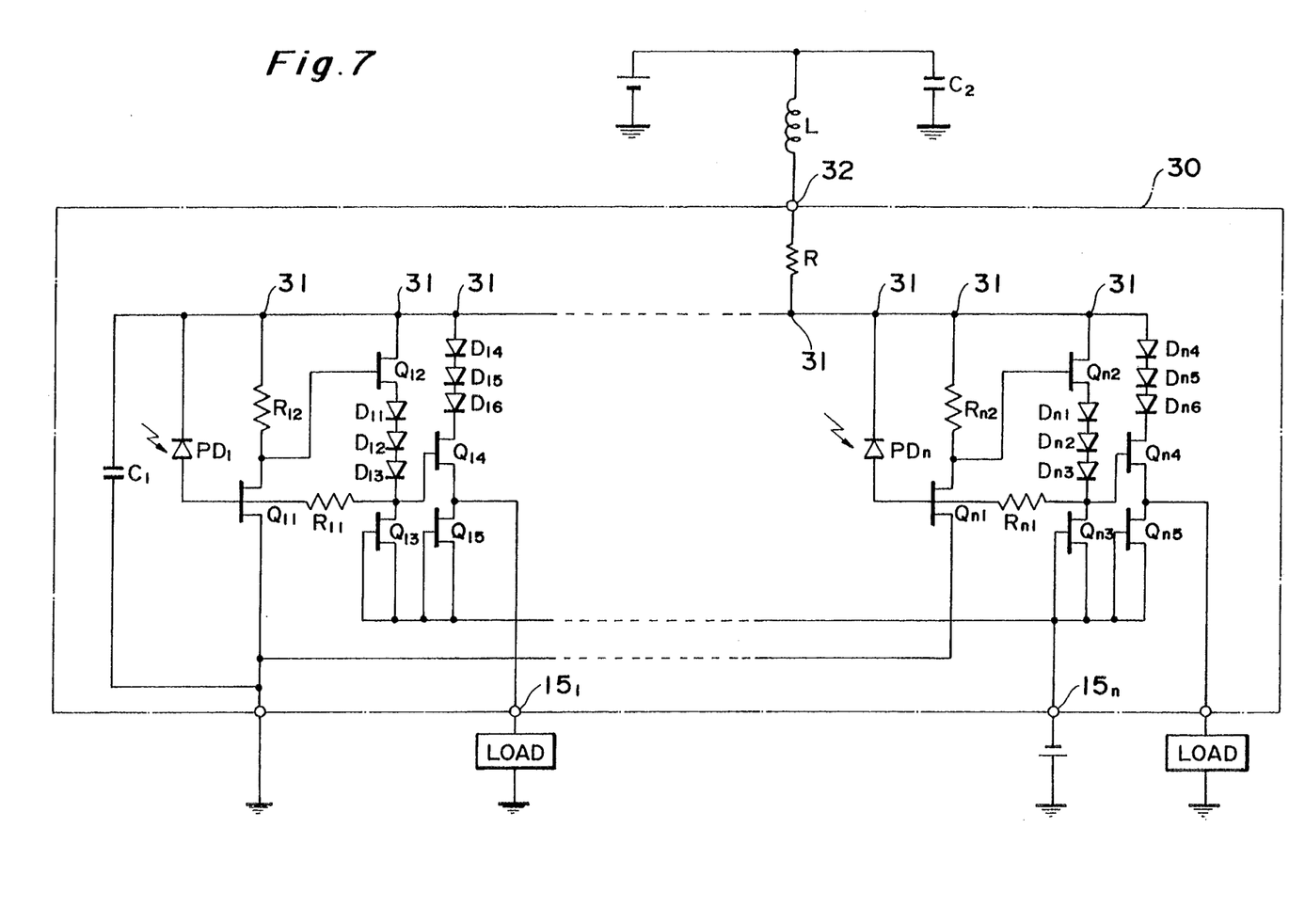
FIG. 7 is a circuit diagram of an example of the OEIC array according to the first embodiment.

FIG. 7 shows one example of the circuit of the OEIC array according to this embodiment. In FIG. 7, the first channel and the final (n−1)-th channel are shown. The second through (n−1)-th channels are not shown. These channels are monolithically integrated on the same semiconductor substrate, and all the channels have the same structure as the first channel.

The first channel includes a photodiode $PD_1$, resistor devices $R_{11}$, $R_{12}$, transistors $Q_{11} \sim Q_{15}$, and level shift diodes $D_{11} \sim D_{16}$. The photodiode PD1 is provided by a PIN photodiode having a GaInAs layer as a photoabsorptive layer formed on an InP layer. The transistors $Q_{11} \sim Q_{15}$ are provided by HEMTs having an N-AlInAs layer and a GaInAs layer, junction transistors, hereto bipolar transistors of InP/GaInAs hetero junction or others. The resistor devices R, $R_{11}$, $R_{12}$ are metal thin film resistors or others formed by sputtering or others.

The photodiode $PD_1$, and the resistor device $R_{11}$ constitute an optical detection stage, and the transistor $Q_{11}$ and the resistor device $R_{12}$ constitute an amplification stage for amplifying an input signal detected by the optical detection stage. The transistors $Q_{12}$, $Q_{13}$, and the level shift diodes $D_{11} \sim D_{13}$ constitute a level shift stage, and the level shift diodes $D_{14} \sim D_{18}$, and the transistors $Q_{14}$, $Q_{15}$ constitute a source follower stage.

In the OEIC array 30 of such structure as well, the electric source power supply terminal 32, and the common electric power source contact 31 of the respective channels are connected to one another through the resistor device R. This resistor device R functions to decrease crosstalks as in the circuit of FIG. 5.

As described above, the optoelectronic integrated circuit device according to this embodiment includes a common electric power source contact where at least two of the amplifiers of the respective channels are connected to each other to have the same potential. This common electric power source contact, and the electric source power supply terminal for supplying an electric source power to the optoelectronic integrated circuit device are connected to each other through the resistor device. When an external electric power source circuit connected to the electric source power supply terminal resonates at a specific frequency, the resistor device can decrease an impedance at the resonance. Consequently, source voltage deflections supplied to the amplifiers of the other channels are decreased, whereby outputs of the other channels are less affected, and crosstalk can be decreased.

Figure 8:
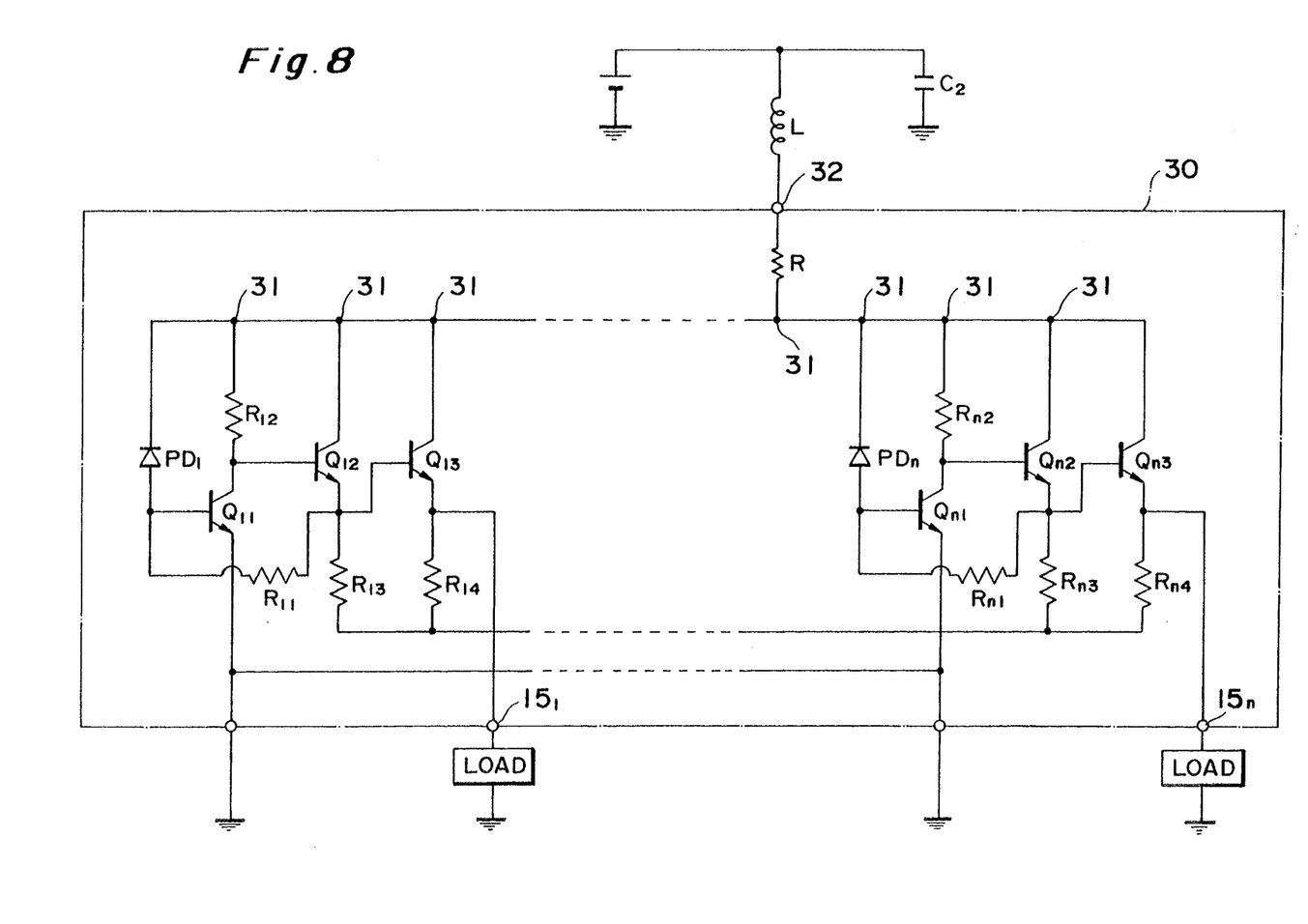
FIG. 8 is a circuit diagram of a modification of the example of the first embodiment of FIG. 7.

FIG. 8 shows a modification of the circuit of FIG. 7 and includes the amplifiers provided by hetero junction bipolar transistors. A photodiode $PD_1$ and a resistor $R_{11}$ constitute an optical detection stage; and a transistor $Q_{11}$ and a resistor $R_{12}$ constitute a amplification state; a transistor $Q_{12}$ and a resistor $R_{13}$ constitute a level shift stage; and a transistor $Q_{14}$ and a resistor $R_{14}$ constitute an emitter follower stage. This circuit can produce the same effect as that of FIG. 7.

Figure 9:
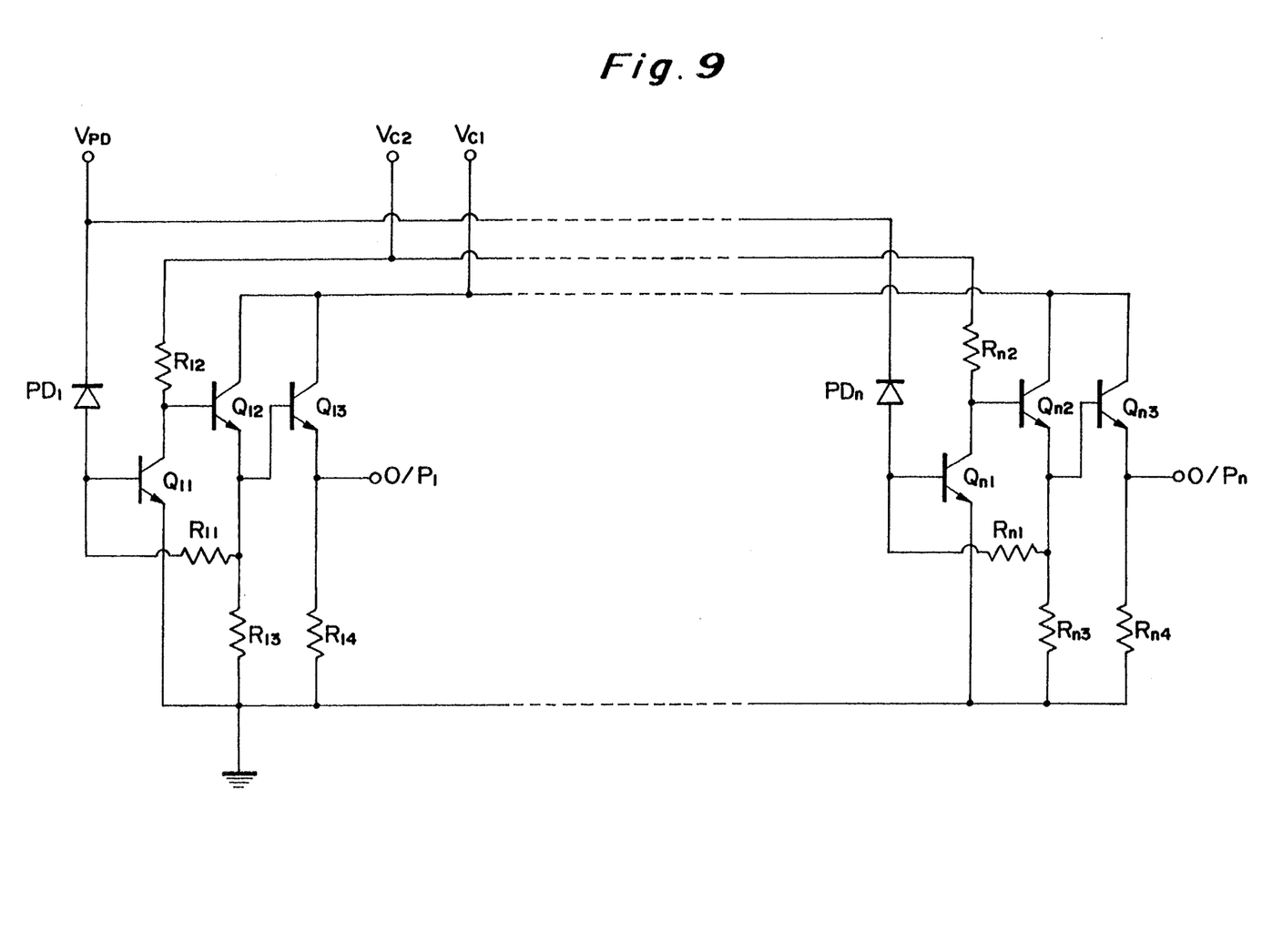
FIG. 9 is a circuit diagram of the OEIC array according to a second embodiment of this invention.

FIG. 9 is a circuit diagram of the OEIC array according to a second embodiment of this invention.

The OEIC array according to this embodiment is not specifically limited in a number of channels but usually have $4 \sim 12$ channels depending on applications. In FIG. 9, the first channel and a final n-th channel (n=$4 \sim 12$) are shown, and the second to the (n−1)-th channels are not shown. These channels are monolithically integrated on the same semiconductor chip. In the 0.8 μm-wavelength band optical communication, this semiconductor substrate is formed of GaAs. This substrate is formed of InP for the 1.3 μm- and 1.55 μm-wavelength band optical communication. The respective channels have the same structure and circuit operation as the first channel, whose structure will be explained below.

The first channel comprises a photodiode $PD_1$, resistors $R_{11} \sim R_{14}$, and bipolar transistors $Q_{11}$ $Q_{13}$ The photodiode $PD_1$ is an MSM (metal semiconductor metal) or a PIN photodiode. The bipolar transistors $Q_{11} \sim Q_{13}$ are hetero junction bipolar transistors (HBTs) of InP-/GaInAs hetero junction or AlGaAs/GaAs hetero junction. The combination of a PIN photodiode, and HBTs of InP/GaInAs formed on an InP semiconductor substrate is the best in terms of the operational performance.

The photodiode $PD_1$ and a resistor $R_{11}$ constitute an optical detection stage. The transistor $Q_{11}$, and the resistor $R_{12}$ constitute an amplification stage for amplifying an input signal detected by the optical detection stage. The transistor $Q_{12}$ and the resistor $R_{13}$ constitute a level shift stage, and the transistor $Q_{13}$ and transistor $R_{14}$ constitute an emitter follower stage. In such structure, an optical signal detected by the photodiode $PD_1$ is converted to a photocurrent, and this photocurrent is converted to a voltage signal by the resistor $R_{11}$. This voltage signal is supplied to the base of the transistor $Q_{11}$, whose load is the resistor $R_{12}$, to be amplified by a set times here. The amplified input signal has a direct current level shifted by a next level shift stage. Its shift amount is substantially determined by a resistance value of the resistor $R_{13}$. Finally an output impedance of the amplifier is decreased by the emitter follower, and a fan out of a receiver output signal $O/P_1$ is secured.

In this embodiment, the level shift stages and the emitter follower stages of the respective amplifiers except the amplification stages thereof are commonly supplied with an electric source power $V_{C1}$, and the amplification stages of the respective amplifiers are commonly supplied with an electric source power $V_{C2}$. That is, the electric power source wiring for supplying the source power $V_{C2}$ to the amplification stages is electrically separated from the electric power source wiring for supplying the source power $V_{C1}$ to the other stages other than the amplification stages. Accordingly, the electric source power supply to the amplification stages of the respective amplifiers, which are sensitive to voltage deflections, is made independently from the electric source power supply to the level shift stages and the emitter follower stages of the respective amplifiers. Consequently, an optical signal input to one channel does not deflect output voltages of the other channels.

That is, even when the above-described modulated current $\Delta I_m$ is generated in the level shift stage or the emitter follower stage of one amplifier, a voltage deflection $\Delta V_D$ caused by this modulated current does not affect the amplification stages of the other amplifiers. Consequently the electric source power supply to the amplification stages of the respective amplifiers is stable, and noise signal components are not unintentionally increased on the respective amplification stages. Correct optical communication can be performed.

Figure 10:
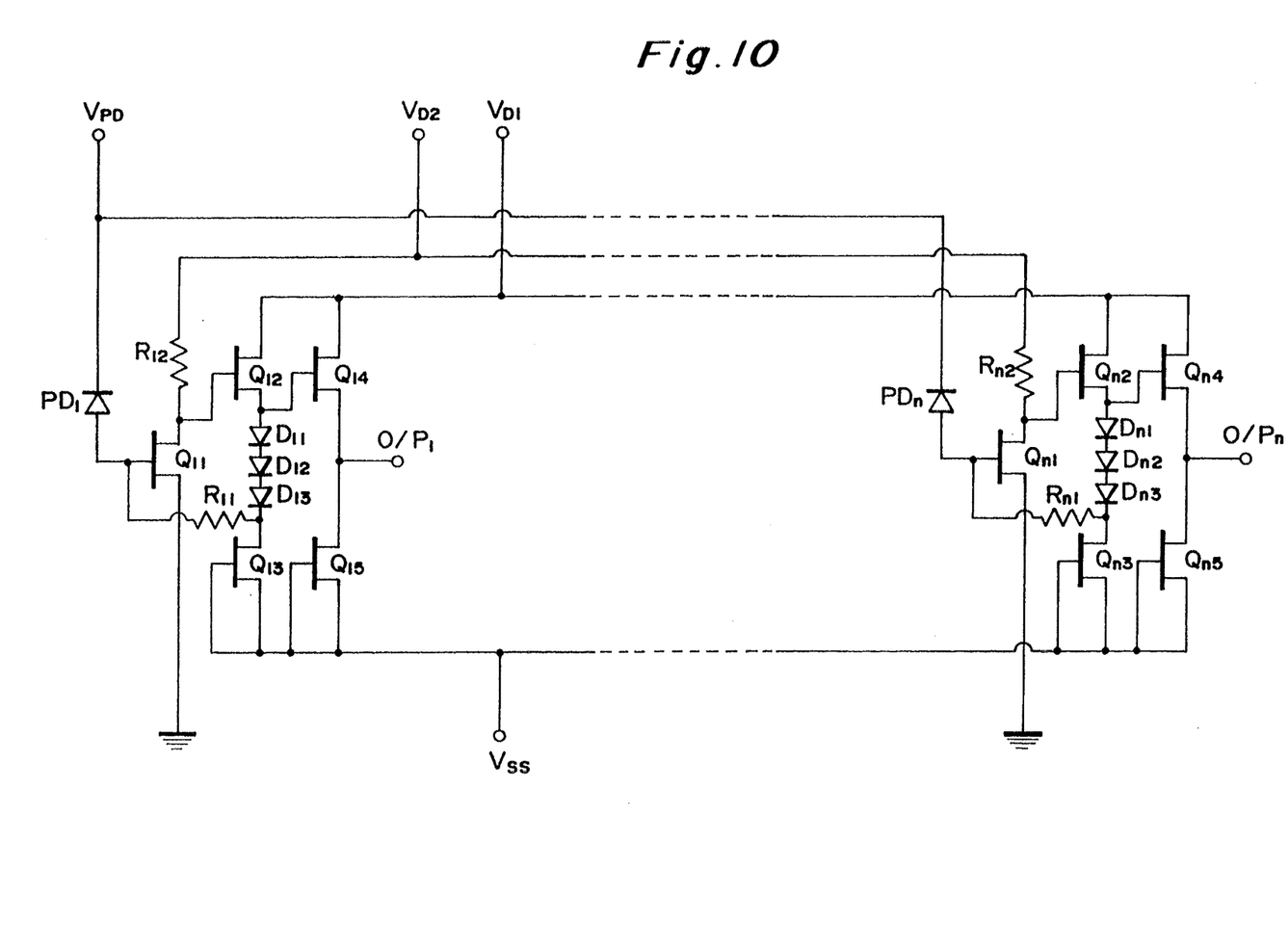
FIG. 10 is a circuit diagram of the OEIC array according to a third embodiment of this invention.

FIG. 10 is a circuit diagram of the OEIC array according to a third embodiment of this invention.

Different from the second embodiment of FIG. 9, the OEIC array according to this embodiment uses FET transistors.

The first channel comprises a photodiode $PD_1$, resistors $R_{11} \sim R_{12}$, field effect transistors FETs $Q_{11} \sim Q_{15}$, and level shift diodes $D_{11} \sim D_{13}$. The photodiode $PD_1$ is an MSM or a PIN photodiode. The FETs $Q_{11} \sim Q_{15}$ lare junction FETs, HEMTs, MOSFETs, MESFETs or others. The combination of a PIN photodiode, and HEMTs formed on an InP semiconductor substrate is the best in terms of the operational performance.

The photodiode $PD_1$ and a resistor $R_{11}$ constitute an optical detection stage. The FET $Q_{11}$, and the resistor $R_{12}$ constitute an amplification stage for amplifying an input signal detected by the optical detection stage. The FETs $Q_{12}$, $Q_{13}$, and the diodes $D_{11} \sim D_{13}$ constitute a level shift stage, and the FETs $Q_{14}$, $Q_{15}$ constitute a source follower stage.

In this embodiment, the level shift stages and the source follower stages of the respective amplifiers except the amplification stages thereof are commonly supplied with an electric source power $V_1$, and the amplification stages of the respective amplifiers are commonly supplied with an electric source power $V_{C2}$. Accordingly; the electric source power supply to the amplification stages of the respective amplifiers, which are sensitive to voltage deflections is made independently from the electric source power supply to the level shift stages and the source follower stages of the respective amplifiers.

Consequently, even when the above-described modulated current $\Delta I_m$ is generated in the level shift stage or the source follower stage of one amplifier, a voltage deflection $\Delta V_D$ caused by this modulated current does not affect the amplification stages of the other amplifiers.

The circuits according to the second the third embodiments can suppress the crosstalk from about $-30$ dB of the conventional structures to below $-40$ dB. In the parallel optical fiber communication, the deterioration of a minimum receiver sensitivity due to crosstalk can be decreased.

As described above, according to the second and the third embodiments, the electric source power supply to the amplification stages of the respective amplifiers, which are sensitive to voltage deflections, is made independently from the electric source power supply to the other stages of the respective amplifiers other than the amplification stages. Consequently, an optical signal inputted to one channel does not cause the deflection of output voltages of the other channels, and no crosstalk does not occur. Thus, the OEIC array according to this invention can effectively prevent the deterioration of a minimum receiver sensitivity due to occurrences of crosstalk.

Figure 11:
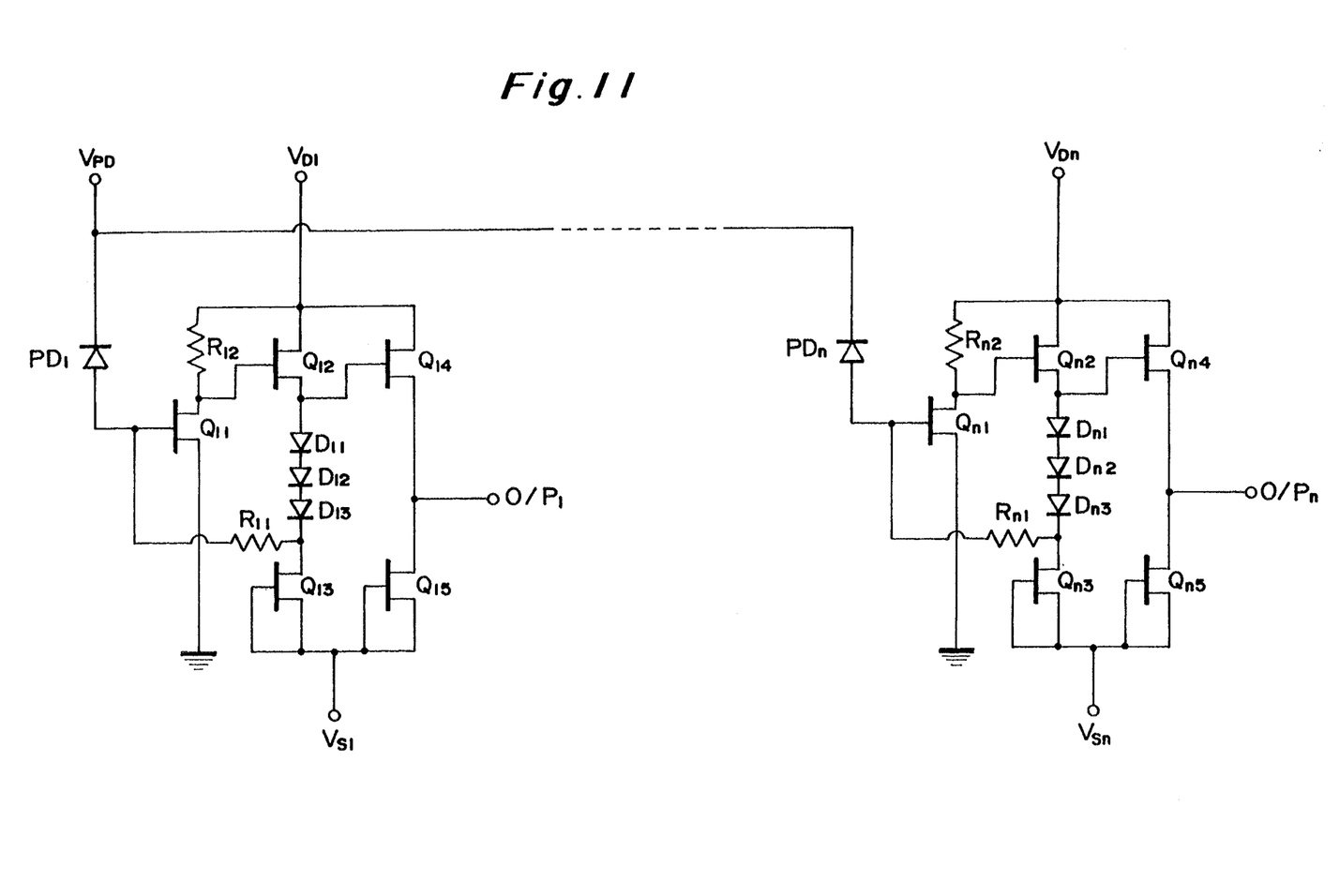
FIG. 11 is a circuit diagram of the OEIC array according to a fourth embodiment of this invention.

FIG. 11 is a circuit diagram of the OEIC array according to a fourth embodiment of this invention.

In FIG. 11, the first channel and a final nth channel ($n = 4 \sim 12$) are shown, and the second to the ($n-1$)th channels are not shown. These channels are monolithically integrated on the same semiconductor chip. In the 0.8 $\mu$m-wavelength band optical communication, this semiconductor substrate is formed of GaAs. This substrate is formed of InP for the 1.3 $\mu$m- and 1.55 $\mu$m-wavelength band optical communication.

The first channel unit comprises a photodiode $PD_1$, resistors $R_{11}$, $R_{12}$, transistors $Q_{11} \sim Q_{15}$, and level shift diodes $D_{11} \sim D_{13}$. The photodiode $PD_1$ is an MSM or a PIN photodiode. The transistors $Q_{11} \sim Q_{15}$ are junction field effect transistors (FETs), HEMTs, MISFETs, MESFETs or others. It is the best combination in the operational performance to form a PIN photodiode and HEMTs on an InP semiconductor substrate.

The photodiode $PD_1$ and a resistor $R_{11}$ constitute an optical detection stage. The transistor $Q_{11}$, and the resistor $R_{12}$ constitute an amplification stage for amplifying an input signal detected by the optical detection stage. The transistors $Q_{12}$, $Q_{13}$, and the diodes $D_{11} \sim D_{13}$ constitute a level shift stage, and the transistors $Q_{14}$, $Q_{15}$ constitute a source follower stage.

In this embodiment, each channel unit, which comprises an amplifying stage, a level shift stage, and source follower stage, is provided with electric source terminals. That is, the first channel is provided with electric power source terminals $V_{D1}$, $V_{S1}$, and the n-th channel is provided with electric power source terminals $V_{Dn}$, $V_{Sn}$. Accordingly, in the case that the OEIC array according to this embodiment in which the respective amplifiers are not connected to one another on the same chip is mounted on a hybrid substrate, bypass condensers having a sufficiently large capacity can be connected to the respective amplifiers. That is, power source wirings are led out from the power source terminals $V_{Dn}$, $V_{Sn}$ to connect on the hybrid substrate each amplifier to the associated large-capacity bypass condenser. The source wiring of each channel is connected to a common electric power source by way of the associated condenser. In this wiring arrangement, each amplifier is supplied with an electric source power through the associated large-capacity bypass condenser.

Consequently, in a case that the above-described modulated current $\Delta I_m$ is generated in one channel, this modulated current is bypassed by the associated large-capacity condenser with the amplifier. Accordingly, noise generated in one channel does not affect the other channels, and substantially no crosstalk occurs among the channels. This embodiment can suppress the crosstalk about $-30$ dB to below 40 dB. In the parallel optical fiber communication, the deterioration of the minimum receiver sensitivity can be reduced.

In a case that it is not a hybrid substrate that the OEIC array according to this invention is mounted on, it is possible to separately supply an electric source power to the respective amplifiers. Consequently, it does not happen in the OEIC array according to this invention that, as does in the conventional OEICs, a modulated current generated in the amplifier of one channel extends to the other channels through the power source wiring which is common to the respective channels. The supply of a source power to the respective amplifiers through their associated power source terminals $V_{Dn}$, $V_{Sn}$ can sufficiently reduce crosstalk among the channels. In this case, the same advantageous effect as in the above-described embodiment can be produced, but a generated modulated current cannot be sufficiently bypassed.

Figure 12:
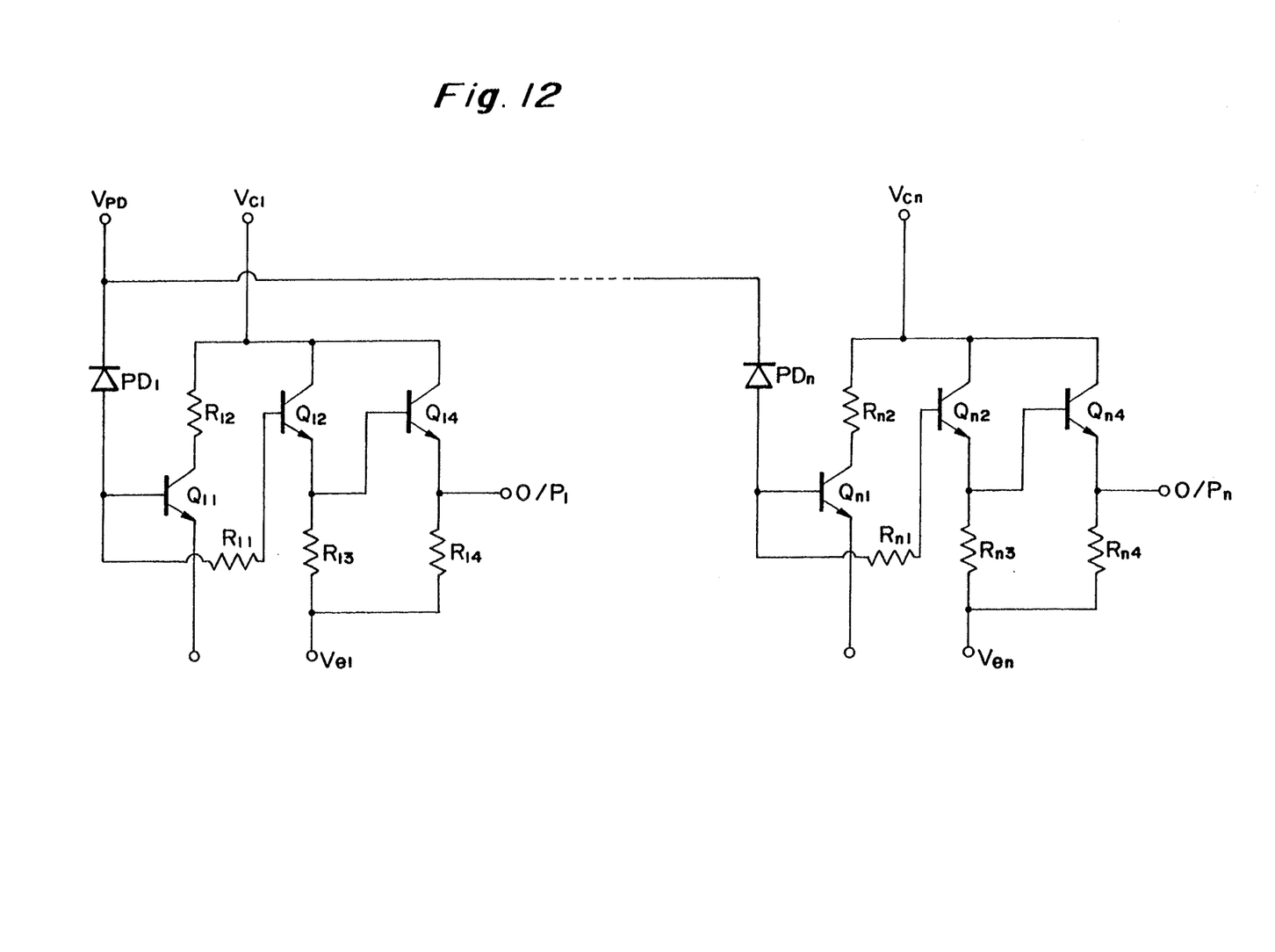
FIG. 12 is a circuit diagram of one modification of the embodiment of FIG. 11.

FIG. 12 shows the same circuit as that of FIG. 11 except that the FET transistors of latter are replaced by hetero junction bipolar transistors. A photodiode PD1 and a resistor $R_{11}$ constitute a optical detection stage; a transistor $Q_{11}$ and a resistor $R_{12}$ constitute an amplification stage; a transistor $Q_{12}$ and a resistor $R_{13}$ constitute a level shift stage; and a transistor $Q_{14}$ and a resistor $R_{14}$ constitute an emitter follower stage.

As described above, according to the fourth embodiment, electric power source terminals for operating each amplifier are provided on its associated channel. Consequently, an electric source power can be separately supplied to the respective amplifiers. Thus an OEIC array which has succeeded in effectively minimizing the deterioration of the receiver sensitivity caused by crosstalk among the respective channels can be provided.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

I claim:

1. An optoelectronic integrated circuit device comprising:
   a first optical receiving circuit including a first optical receiving device for converting a received optical signal to an electric signal, and a first amplifier for amplifying an output signal of the first optical receiving device,
   a second optical receiving circuit including a second optical receiving device for converting a received optical signal to an electric signal, and a second amplifier for amplifying an output signal of the second optical receiving device,
   a power supply terminal connectable to an external power supply device for supplying power,
   common power supply wiring means for supplying operating power to the first optical receiving circuit and the second optical receiving circuit, and
   a resistor device, one end of the resistor device being connected to the power supply terminal, and the other end being connected to the power supply wiring means;
   said first optical receiving circuit and said second optical receiving circuit being formed on a same semiconductor substrate.

2. An optoelectronic integrated circuit device according to claim 1, wherein the first amplifier and the second amplifier each includes heterojunction bipolar transistors.

3. An optoelectronic integrated circuit device according to claim 1, wherein the first amplifier and the second amplifier each includes junction bipolar transistors.

4. An optoelectronic integrated circuit device according to claim 1, wherein the resistor device is a thin metal film on the semiconductor substrate.

5. An optoelectronic integrated circuit device according to claim 1, wherein the resistor device has a resistance of 1–10$\Omega$.

6. An optoelectronic integrated circuit device according to claim 1, wherein the power supply terminal is connected to the external power source by a terminal wiring means.

7. An optoelectronic integrated circuit device according to claim 1, wherein:
   the semiconductor substrate is an InP substrate;
   the first and second optical receiving devices are PIN photodiodes; and
   each of the first and second amplifiers includes heterojunction bipolar transistors.

8. An optoelectronic integrated circuit device according to claim 1, wherein:
   the semiconductor substrate is an InP substrate;
   the first and second optical receiving devices are PIN photodiodes; and
   each of the first and second amplifiers includes high electron mobility transistors.

9. An optoelectronic integrated circuit device comprising:
   a first optical receiving circuit including,
     a first optical receiving device for converting a received optical signal to an electric signal, and
     a first amplifier, the first amplifier including a first amplification stage circuit for amplifying an output signal of the first receiving device, and a first latter stage circuit having a first level shift stage circuit for varying a direct current level of a signal output from the first amplification stage circuit and a first emitter follower stage circuit for lowering an output impedance:
   a second optical receiving circuit including,
     a second optical receiving device for converting a received optical signal to an electric signal, and
     a second amplifier, the second amplifier including a second amplification stage circuit for amplifying an output signal of the second receiving device, and a second latter stage circuit having a second level shift stage circuit for varying a direct current level of a signal output from the second amplification stage circuit and a second emitter follower stage circuit for lowering an output impedance:

a first power supply wiring means connected to the first amplification stage circuit and to the second amplification stage circuit for supplying operating power thereto; and a second power supply wiring means connected to the first latter stage circuit and the second latter stage circuit for supplying operating power thereto, the second power supply wiring means being electrically separated from the first power supply wiring means, the first optical receiving circuit and the second optical receiving circuit being formed on a same semiconductor base substrate.

10. An optoelectronic integrated circuit according to claim 9, wherein the first power supply wiring means is connected to a first power supply terminal connected to a first power supply through a first external wiring means; and the second power supply wiring means is connected to a second power supply terminal connected to a second power supply through a second external wiring means.

11. An optoelectronic integrated circuit according to claim 9, wherein:

the semiconductor substrate is an InP substrate;
the first and second optical receiving devices are PIN photodiodes; and
each of the first and second amplifiers includes high electron mobility transistors.

12. An optoelectronic integrated circuit device comprising:

a first optical receiving circuit including,
a first optical receiving device for converting a received optical signal to an electric signal, and
a first amplifier, the first amplifier including a first amplification stage circuit for amplifying an output signal of the first receiving device, and a first latter stage circuit having a first level shift stage circuit for varying a direct current level of a signal outputted from the first stage circuit and a first source follower stage circuit for lowering an output impedance, a second optical receiving circuit including,
a second optical receiving device for converting a received optical signal to an electric signal, and
a second amplifier, the second amplifier including a second amplification stage circuit for amplifying an output signal of the second receiving device, and a second latter stage circuit having a second level shift stage circuit for varying a direct current level of a signal outputted from the second amplification stage circuit and a second source follower stage circuit for lowering an output impedance, a first power supply wiring means connected to the first amplification stage circuit and to the second amplification stage circuit for supplying operating power thereto, and a second power supply wiring means connected to the first latter stage circuit and to the second latter stage circuit for supplying operating power thereto, the second power supply wiring means being electrically separated from the first power supply wiring means; and the first optical receiving circuit and the second optical receiving circuit being formed on a same semiconductor base substrate.

13. An optoelectronic integrated circuit device according to claim 12, wherein the first power supply wiring means is connected to a first power supply terminal connected to a first power supply through a first external wiring means; and the second power supply wiring means is connected to a second power supply terminal connected to a second power supply through a second external wiring means.

14. An optoelectronic integrated circuit according to claim 12, wherein:

the semiconductor substrate is an InP substrate;
the first and second optical receiving devices are PIN photodiodes; and
each of the first and second amplifier includes high electron mobility transistors.

15. An optoelectronic integrated circuit device comprising:

from four to twelve optical receiving circuits formed on a same substrate,
each optical receiving circuit including
an optical receiving device for converting a received optical signal to an electric signal,
an amplifier for amplifying an output signal of the optical receiving device, and
a power supply wiring means for supplying operating power to the optical receiving circuit,
the power supply wiring means of each of the optical receiving circuits being electrically separated from the power supply wiring means of the other optical receiving circuits.

16. An optoelectronic integrated circuit device according to claim 15, wherein the amplifier comprises an amplification stage circuit for amplifying an output of its optical receiving device, a level shift stage circuit for shifting a direct current level of an output of the amplification stage circuit, and a source follower stage circuit for lowering an output impedance of the amplifier.

17. An optoelectronic integrated circuit device according to claim 15, wherein the amplifier comprises an amplification stage circuit for amplifying an output of its optical receiving device, a level shift stage circuit for shifting a direct current level of an output of the amplification stage circuit, and an emitter follower stage circuit for lowering an output impedance of the amplifier.

18. An optoelectronic integrated circuit device according to claim 15, wherein the power supply wiring means is connected to a power supply terminal connected to a power supply through an external wiring means.

19. An optoelectronic integrated circuit according to claim 15, wherein:

the semiconductor substrate is an InP substrate;
the optical receiving device is a PIN photodiode; and
the amplifier includes a high electronic mobility transistor.

* * * * *